US012712328B2

(12) United States Patent
Kim et al.

(10) Patent No.: US 12,712,328 B2
(45) Date of Patent: Aug. 18, 2026

(54) MEASUREMENT APPLICATION PROBE, MEASUREMENT APPLICATION DEVICE, AND MEASUREMENT APPLICATION SYSTEM

(71) Applicant: Rohde & Schwarz GmbH & Co. KG, Munich (DE)

(72) Inventors: Hongjin Kim, Singapore (SG); Kevin Guo, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 249 days.

(21) Appl. No.: 18/360,276

(22) Filed: Jul. 27, 2023

(65) Prior Publication Data

US 2025/0038466 A1 Jan. 30, 2025

(51) Int. Cl.

*H01R 31/00* (2006.01)
*G07C 5/08* (2006.01)
*H01R 13/70* (2006.01)
*H01R 31/06* (2006.01)

(52) U.S. Cl.

CPC ......... *H01R 31/065* (2013.01); *G07C 5/0808* (2013.01); *H01R 13/70* (2013.01); *G07C 2205/02* (2013.01); *H01R 2201/20* (2013.01); *H01R 2201/26* (2013.01)

(58) Field of Classification Search

CPC .. H01R 31/065; H01R 13/70; H01R 2201/20; H01R 2201/26; G07C 5/0808; G07C 2205/02

See application file for complete search history.

(56) References Cited

U.S. PATENT DOCUMENTS

| | | | | |
|---|---|---|---|---|
| 2012/0044086 A1* | 2/2012 | Ruther | G07C 5/0816 | 340/870.02 |
| 2013/0066514 A1* | 3/2013 | Das | G07C 5/008 | 701/31.5 |
| 2014/0180531 A1* | 6/2014 | Lipscomb | G07C 5/008 | 701/33.2 |

(Continued)

OTHER PUBLICATIONS

Data Link Connector (Automotive), Wikipedia, Aug. 22, 2023, 1 page.
Dashdyno SPD User Guide, Auterra, 2007-2010, 122 pages.

*Primary Examiner* — Peter D Nolan
*Assistant Examiner* — Peter Y Ning
(74) *Attorney, Agent, or Firm* — BROOKS KUSHMAN P.C.

(57) ABSTRACT

The present disclosure provides a measurement application system comprising a measurement application probe comprising an automotive connector configured to couple to an in-vehicle connector, and at least one measurement application device connector, and the measurement application system further comprising a measurement application device comprising at least one measurement interface coupled to a respective measurement application device connector of the measurement application probe, and configured to receive a measurement signal from the measurement application probe, and a protocol decoder coupled to the measurement interface, and configured to decode the received at least one measurement signal according to a predefined communication protocol. In addition, the present disclosure provides a measurement application probe, and a measurement application device.

21 Claims, 11 Drawing Sheets

(56) References Cited

U.S. PATENT DOCUMENTS

| | | | | |
|---|---|---|---|---|
| 2014/0244213 | A1* | 8/2014 | Theriot | G07C 5/0808 702/183 |
| 2016/0042578 | A1* | 2/2016 | Whitehead | G07C 5/0808 701/33.3 |
| 2017/0324817 | A1* | 11/2017 | Oliveira | H04L 67/10 |
| 2018/0047223 | A1* | 2/2018 | Lewis | G07C 5/008 |
| 2020/0189911 | A1* | 6/2020 | Koehler | C01B 3/326 |
| 2022/0044500 | A1* | 2/2022 | Yang | H04L 67/12 |
| 2023/0252830 | A1* | 8/2023 | Merg | G07C 5/006 701/29.1 |
| 2023/0311653 | A1* | 10/2023 | Grammatico | G06F 3/0482 701/101 |

* cited by examiner

MEASUREMENT APPLICATION PROBE, MEASUREMENT APPLICATION DEVICE, AND MEASUREMENT APPLICATION SYSTEM

TECHNICAL FIELD

The disclosure relates to measurement application probe, a measurement application device, and a measurement application system.

BACKGROUND

Although applicable to any type of measurement application device, the present disclosure will mainly be described in conjunction with automotive measurement applications.

In modern vehicles, a plurality of different sensors and control units are provided for controlling different aspects of the vehicle. Usually, these control units and sensors are coupled to each other via a digital data bus, like the CAN bus or the FlexRay bus.

Accordingly, there is a need for providing efficient signal analysis in automotive applications.

SUMMARY

The above stated problem is solved by the features of the independent claims. It is understood, that independent claims of a claim category may be formed in analogy to the dependent claims of another claim category.

Accordingly, it is provided:

A measurement application probe comprising an automotive connector configured to couple to an in-vehicle connector, and at least one measurement application device connector.

Further, it is provided:

A measurement application device comprising at least one measurement interface configured to couple to a measurement application probe, and to receive a measurement signal from the measurement application probe, and a protocol decoder coupled to the measurement interface, and configured to decode the received at least one measurement signal according to a predefined communication protocol.

Further, it is provided:

A measurement application system comprising a measurement application probe comprising an automotive connector configured to couple to an in-vehicle connector, and at least one measurement application device connector. The measurement application system further comprises a measurement application device comprising at least one measurement interface coupled to a respective measurement application device connector of the measurement application probe, and configured to receive a measurement signal from the measurement application probe, and a protocol decoder coupled to the measurement interface, and configured to decode the received at least one measurement signal according to a predefined communication protocol.

The present disclosure is based on the finding that known automotive measurement tools usually only allow acquiring bus data and viewing the bus data in a binary or a decoded form. Such measurement tools, however, do not allow to measure and display the raw signals of e.g., a data bus like the automotive CAN bus.

For a user of such measurement tools e.g., an automotive engineer, the known measurement tools may provide valuable information about the status of the ECUs (Electronic Control Units), sensors, and actuators in the vehicle that communicate over a respective bus.

However, such known tools do not allow to determine further metrics of the bus, especially, regarding the analog waveforms on the bus that represent the digital data to be transmitted via the respective bus.

The present disclosure, therefore, provides the measurement application probe, the measurement application device, and the measurement application system as explained herein.

The measurement application probe comprises an automotive connector that serves for coupling the measurement application probe to an in-vehicle connector. The term "in-vehicle connector" in this regard may refer to any type of electrical connector that may be present in a vehicle. Such a connector may be an easily accessible diagnosis connector, or any other connector of an ECU or a wire harness of the vehicle.

In addition, the measurement application probe comprises a measurement application device connector. The measurement application device connector serves for coupling the measurement application probe to a respective measurement application device.

In a measurement application system, the measurement application probe may be connected to a respective measurement application device. The measurement application device comprises one or more i.e., at least one, measurement interface that may each couple to a measurement application probe. This may be a single measurement application probe with multiple measurement application device connectors, or multiple measurement application probes each with one or more measurement application device connectors, or a combination of both options. Further, not all of the measurement interfaces of the measurement application device need to be coupled to a measurement application probe.

The measurement application device may receive measurement signals from the measurement application probe via the measurement interfaces. The term "measurement signals" in the context of the present disclosure does not refer to digital signals, instead the term "measurement signals" refers to the analog waveforms provided via the in-vehicle connector to the measurement application probe. The in-vehicle connector may e.g., comprise one or more signal lines of a data bus in the vehicle, and may provide the waveforms present on the signal lines to the measurement application probe.

The measurement interface of the measurement application device may comprise the signal acquisition interface of a measurement application device that is configured to acquire analog signals. Such measurement devices may comprise, but are not limited to, oscilloscopes.

The measurement application device further comprises a protocol decoder coupled to the measurement interface of the measurement application device. The protocol decoder decodes the received at least one measurement signal according to a predefined communication protocol. The predefined communication protocol may be provided by a user e.g., via a user interface of the measurement application device. Alternatively, the protocol decoder may automatically detect the respective protocol e.g., by probing if for any one of a predefined group of communication protocols reasonable data is present in the acquired measurement signals.

Generally, a measurement application device according to the present disclosure may comprise any device that may be used in a measurement application to acquire an input signal or to generate an output signal, or to perform additional or supporting functions in a measurement application. A measurement application device may also comprise or be implemented as application or applications, also called measurement application or measurement applications, that may be executed on a computer device and that may communicate with other measurement application devices in order to perform a measurement task. A measurement application, also called measurement setup, may e.g., comprise at least one or multiple different measurement application devices for performing electric, magnetic, or electromagnetic measurements, especially on single devices under test. Such electric, magnetic, or electromagnetic measurements may be performed in a measurement laboratory or in a production facility in the respective production line. A measurement application or measurement setup may serve to qualify the single devices under test i.e., to determine the proper electrical operation of the respective devices under test.

Measurement application devices to this end may comprise at least one signal acquisition section for acquiring electric, magnetic, or electromagnetic signals to be measured from a device under test, or at least one signal generation section for generating electric, magnetic, or electromagnetic signals that may be provided to the device under test. Such a signal acquisition section may comprise, but is not limited to, a front-end for acquiring, filtering, and attenuating or amplifying electrical signals. The signal generation section may comprise, but is not limited to, respective signal generators, amplifiers, and filters.

Further, when acquiring signals, measurement application devices may comprise a signal processing section that may process the acquired signals. Processing may comprise converting the acquired signals from analog to digital signals, and any other type of digital signal processing, for example, converting signals from the time-domain into the frequency-domain.

The measurement application devices may also comprise a user interface to display the acquired signals to a user and allow a user to control the measurement application devices. Of course, a housing may be provided that comprises the elements of the measurement application device. It is understood, that further elements, like power supply circuitry, and communication interfaces may be provided.

A measurement application device may be a stand-alone device that may be operated without any further element in a measurement application to perform tests on a device under test. Of course, communication capabilities may also be provided for the measurement application device to interact with other measurement application devices.

A measurement application device may comprise, for example, a signal acquisition device e.g., an oscilloscope, especially a digital oscilloscope, a spectrum analyzer, or a vector network analyzer. Such a measurement application device may also comprise a signal generation device e.g., a signal generator, especially an arbitrary signal generator, also called arbitrary waveform generator, or a vector signal generator. Further possible measurement application devices comprise devices like calibration standards, or measurement probe tips.

Of course, at least some of the possible functions, like signal acquisition and signal generation, may be combined in a single measurement application device.

In embodiments, the measurement application device may comprise pure data acquisition devices that are capable of acquiring an input signal and of providing the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface. The same applies to pure signal generation devices that may generate an output signal without comprising any user interface or configuration input elements. Instead, such signal generation devices may be operated remotely via a data connection.

In embodiments, any acquired measurement signal that is provided by the measurement application probe to the measurement application device may be shown to a user in analog form e.g., as waveform, and in digital form e.g., as the decoded data, or as bus messages in linear or tabular form.

With the solution provided by the present disclosure, a user may easily analyze the data provided on an in-vehicle data bus. At the same time, the user may also analyze the raw signals or waveforms that are provided on the data bus in order to transmit the digital data.

Especially, with the automotive connector of the measurement application probe, the access to the bus system may easily be provided without the need to peel-off covers from cables and connect directly to the wires.

Further embodiments of the present disclosure are subject of the further dependent claims and of the following description, referring to the drawings.

In the following, the dependent claims referring directly or indirectly to claim 14 are described in more detail. For the avoidance of doubt, the features of the dependent claims relating to the system can be combined in all variations with each other and the disclosure of the description is not limited to the claim dependencies as specified in the claim set. Further, the features of the other independent claims may be combined with any of the features of the dependent claims relating to the system in all variations. All the explanations provided herein for the measurement application device, and the measurement application probe of or in the measurement application system also apply to the measurement application probe, and the measurement application device when claimed individually.

In an embodiment, which can be combined with all other embodiments of the measurement application system mentioned above or below, the automotive connector of the measurement application probe may comprise at least one of a vehicle diagnostic connector configured to couple to a diagnostic in-vehicle connector of a vehicle, and an intermediate adapter connector configured to couple between an in-vehicle connector and a respective in-vehicle plug.

The vehicle diagnostic connector may be provided to couple to any possible standard diagnostic in-vehicle connector that may be present in a respective vehicle. Such diagnostic in-vehicle connectors may comprise, but are not limited to, OBD connectors (On-Board Diagnostics), OBD2 connectors, and DLC (Diagnostic Link Connector) connectors.

Such diagnostic in-vehicle connectors are required in most jurisdictions worldwide and provide a standardized interface to access the vehicles data busses. Therefore, providing access to these diagnostic in-vehicle connectors allows accessing almost any vehicle worldwide e.g., for diagnostics by workshop staff that is servicing the vehicle. On the other hand, such standard diagnostic in-vehicle connectors may also provide limited access to the vehicle data busses.

Therefore, the measurement application probe further provides the possibility to provide an intermediate adapter connector. Such an intermediate adapter connector may be configured to be plugged into an existing connection in the vehicle between a connector and a plug.

Such an intermediate adapter connector may e.g., be shaped or designed to fit into the electrical connector of a vehicle ECU on one side, and may provide the same mechanical interface as the ECU on the other side, for coupling a connector of e.g., a vehicle wire harness to the intermediate adapter connector.

In addition to providing an adequate mechanical interface for the respective in-vehicle connector and plug, the intermediate adapter connector will directly connect each input pin with the respective output pin. With this arrangement, the device at the in-vehicle connector end, and the in-vehicle plug end will not notice the presence of the measurement application probe with the intermediate adapter connector.

By providing the measurement application probe with an intermediate adapter connector any of the busses in the vehicle may easily be contacted and measurements may be performed on any of the available busses.

In another embodiment, which can be combined with all other embodiments of the measurement application system mentioned above or below, the automotive connector of the measurement application probe may comprise a differential measurement input for every measurement application device connector.

Providing the automotive connector with a differential measurement input for each one of the measurement application device connectors, allows measuring the analog waveform of any differential signal as transmitted for vehicle busses, like the CAN bus or the FlexRay bus. It is understood, that the measurement application probe, the measurement application device, and the measurement application system of the present disclosure are not limited to these bus systems and may measure or acquire signals from, but are not limited to, a LIN bus, an automotive Ethernet, like a 100BASE-T1, or a 1000BASE-T1 network.

With such a differential measurement input, instead of requiring two measurement application device connectors, and a measurement application device with two measurement inputs, only one single measurement application device connector is required per vehicle bus that is to be measured. At the same time, at least the analog differential waveform may be analyzed, not only the digital data.

In a further embodiment, which can be combined with all other embodiments of the measurement application system mentioned above or below, the automotive connector of the measurement application probe may comprise a plurality of electrical contacts each one configured to electrically couple to a respective counterpart contact of the in-vehicle connector.

In embodiments, the automotive connector of the measurement application probe may comprise electrical contacts only for specific relevant electrical contacts of the in-vehicle connector.

In other embodiments, the automotive connector of the measurement application probe may comprise one electrical contact for every electrical contact of the in-vehicle connector. This allows selecting, which of the electrical contacts is to be used for acquiring a measurement signal at a later stage, as will be explained below in more detail.

This arrangement is especially useful, if the measurement application probe is e.g., equipped with a standard automotive connector that may be coupled to different in-vehicle connectors of the respective vehicle that may comprise different pin layouts.

In another embodiment, which can be combined with all other embodiments of the measurement application system mentioned above or below, the measurement application probe may further comprise a switching unit coupled to the automotive connector of the measurement application probe, and the at least one measurement application device connector of the measurement application probe, wherein the switching unit may be configured to controllably couple at least one of the measurement application device connectors of the measurement application probe electrically with a selected one of the electrical contacts of the automotive connector of the measurement application probe.

The switching unit may be coupled to all of the electrical contacts of the automotive connector, and to all of the measurement application device connectors available in the measurement application probe.

This allows for the switching unit to controllably couple any one of the electrical contacts of the automotive connector to any one of the measurement application device connectors of the measurement application probe. It is, consequently, possible to provide a signal of any one of the electrical contacts of the automotive connector to the measurement application device for measurement and further analysis.

If the measurement application probe comprises multiple measurement application device connectors, the switching unit may couple one of the pins of the automotive connector to multiple ones of the measurement application device connectors.

In a further embodiment, which can be combined with all other embodiments of the measurement application system mentioned above or below, the switching unit of the measurement application probe may comprise a manually actuated switching element.

The switching unit may in embodiments be manually actuated. The switching unit may e.g., comprise DIP switches, or any other type of switch. For example, a rotary knob or encoder may be provided for a single one or each one of multiple measurement application device connectors. The rotary knobs or encoders may be provided with a position for each electrical contact of the automotive connector. This allows easily dialing in the configuration of the switching unit.

For a differential measurement input, a user input e.g., a switch, to activate and deactivate the differential measurement may be provided. Further, two user inputs for selecting two electrical contacts for the differential measurement input may be provided.

In another embodiment, which can be combined with all other embodiments of the measurement application system mentioned above or below, the measurement application probe may comprise a probe control interface, and the measurement application device may further comprise a device control interface configured to couple to the probe control interface of the measurement application probe, and to retrieve probe identification data from the measurement application probe.

The probe control interface may comprise any type of digital data interface that allows digitally communicating with the measurement application probe.

The probe control interface may e.g., comprise a USB interface. In other embodiments, the probe control interface may comprise any kind of wired and wireless communication interface, like for example a network communication interface, especially an Ethernet, wireless LAN or WIFI interface, a USB interface, a Bluetooth interface, an NFC interface, a visible or non-visible light-based interface, especially an infrared interface. The same explanations apply to the device control interface.

The measurement application device may comprise the device control interface in order to couple to the measurement application probe, and retrieve probe identification data. Retrieving the probe identification data allows to easily configure the measurement application device, and adapt the measurement application device to the measurement application probe.

In another further embodiment, which can be combined with all other embodiments of the measurement application system mentioned above or below, the switching unit of the measurement application probe may comprise an electrically controlled switching element, and the probe control interface may be coupled to the switching unit of the measurement application probe.

In embodiments, the switching unit may comprise the electronically controlled switching element that may be controlled via the probe control interface.

With such an arrangement, instead of manually configuring the switching unit, the switching unit may be configured automatically via the measurement application device.

The measurement application device may e.g., after identifying the measurement application probe, select a respective configuration and control the switching unit accordingly. The measurement application device may e.g., allow a user to load stored measurement configurations and may then automatically configure the measurement application probe accordingly.

In a further embodiment, which can be combined with all other embodiments of the measurement application system mentioned above or below, the measurement application device may further comprise a user interface configured to present contact selection information to a user based on the identification data, and to receive a user input regarding a selection of at least one electrical contact of the measurement application probe. The device control interface may further be configured to transmit a control signal to the measurement application probe based on the received user input, wherein the probe control interface of the measurement application probe may be configured to receive the control signal, and wherein the switching unit of the measurement application probe may be configured to couple a signal conductor of at least one of the measurement application device connectors of the measurement application probe electrically with a selected one of the electrical contacts of the automotive connector of the measurement application probe based on the received control signals.

The measurement application device may comprise a user interface e.g., a display with respective input elements like a touchscreen, buttons, and switches. Generally, the user interface may comprise any type of input device that may be actuated by a user.

The user interface may show contact selection information to a user. Such contact selection information may comprise information about the available electrical contacts of the automotive connector, and may allow a user to select any one of the electrical contacts for forwarding the respective signal to a measurement application device connector. In embodiments, if a differential measurement input is used, two electrical contacts may be selected for a single measurement application device connector. If multiple measurement application device connectors are present, two electrical contacts may be selected for each one of the measurement application device connectors.

A user may select the respective electrical contacts in the measurement application device. The measurement application device may then control the measurement application probe via the device control interface, and the probe control interface in order to configure the switching unit accordingly.

In another embodiment, which can be combined with all other embodiments of the measurement application system mentioned above or below, the measurement application device connector of the measurement application probe may comprise a coaxial connector. In an embodiment, the at least one measurement interface of the measurement application device may comprise a coaxial connector.

Of course, any type of connection may be used between the measurement application device, and the measurement application probe.

In order to provide high quality measurements, the measurement application probe may comprise a coaxial connector as measurement application device connector. The measurement application device may comprise a respective coaxial connector in the measurement interface.

A coaxial connector may especially comprise, but is not limited, to a BNC connector, and an SMA connector.

Using standard coaxial connectors also allows using a standard measurement application device and implementing the functions as disclosed herein with such a measurement application device.

The measurement application device, and the functions described herein for the measurement application device, may be implemented in, or may comprise a combination of hardware and software e.g., a standard measurement application device with a respectively adapted firmware that is executed by a processor of such a measurement application device.

Generally, the measurement application device, and the functions described herein for the measurement application device may comprise or may be provided in or as part of at least one of a dedicated processing element e.g., a processing unit, a microcontroller, a field programmable gate array, FPGA, a complex programmable logic device, CPLD, an application specific integrated circuit, ASIC, or the like. A respective program or configuration may be provided to implement the required functionality. The measurement application device, and the functions described herein for the measurement application device may at least in part also be provided as a computer program product comprising computer readable instructions that may be executed by a processing element. In a further embodiment, the measurement application device, and the functions described herein for the measurement application device may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them. The same applies to the measurement application probe.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
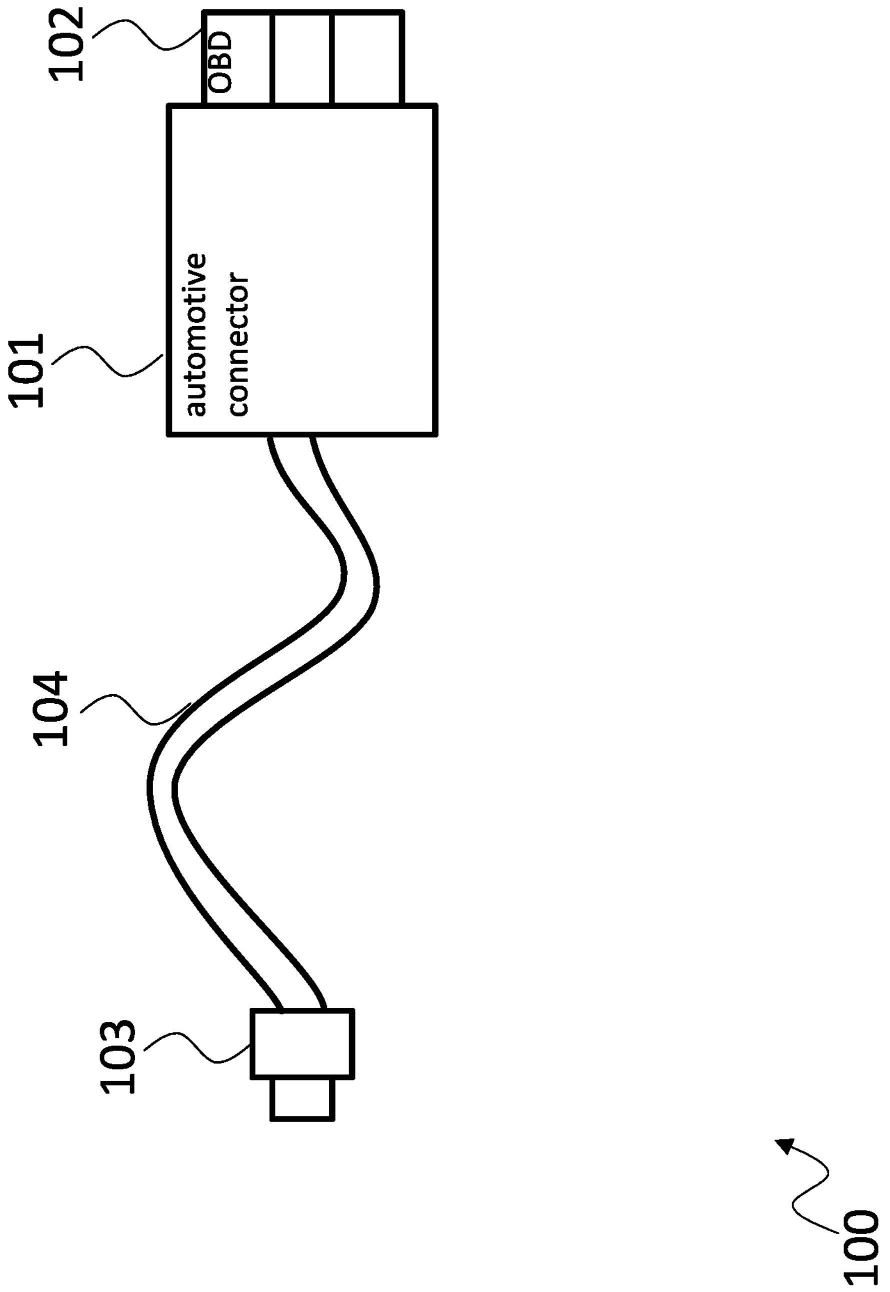
FIG. 1 shows a block diagram of an embodiment of a measurement application probe.

FIG. 1 shows a block diagram of a measurement application probe 100. The measurement application probe 100 comprises an automotive connector 101 that is coupled via a cable 104 to a measurement application device connector 103.

The automotive connector 101 serves for coupling the measurement application probe 100 to a vehicle, and to this end comprises a vehicle diagnostic connector 102, in this exemplary embodiment denominated OBD for the standard On-Board-Diagnostic connector.

The cable 104 may be a coaxial cable, as well as the measurement application device connector 103 may be a coaxial connector. The automotive connector 101 may measure or acquire a raw or analog signal via the vehicle diagnostic connector 102 on a vehicle bus that may be coupled via the vehicle diagnostic connector 102 to the measurement application probe 100.

This analog signal may then be provided to a measurement application device for further processing.

Although only one cable 104, and one measurement application device connector 103 is shown, any number of measurement application device connectors and respective cables may be provided.

Figure 2:
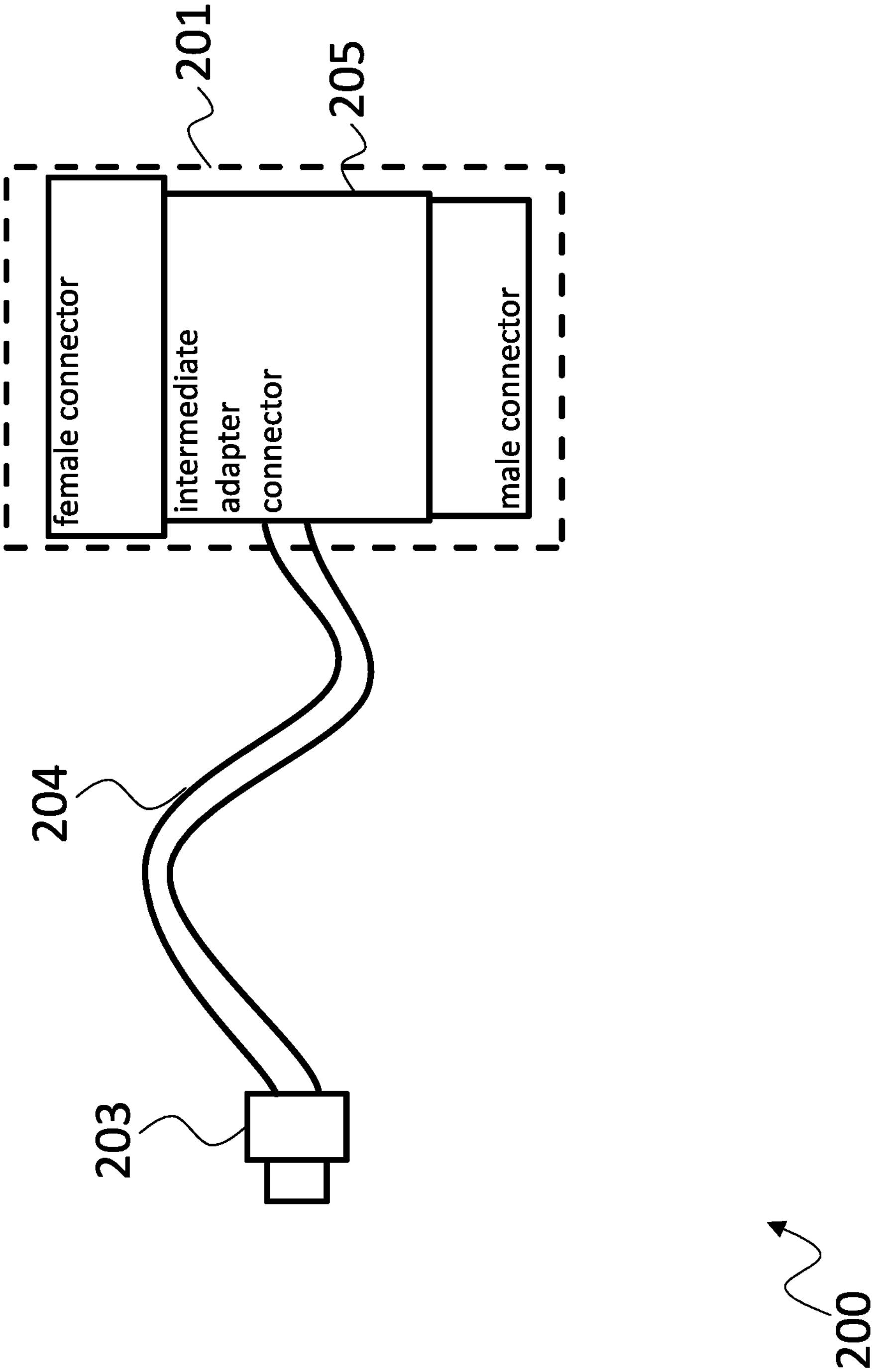
FIG. 2 shows a block diagram of another embodiment of a measurement application probe.

FIG. 2 shows a block diagram of a measurement application probe 200. The measurement application probe 200 is based on the measurement application probe 100. Therefore, the measurement application probe 200 comprises an automotive connector 201 that is coupled via a cable 204 to a measurement application device connector 203. The explanations provided above and below regarding any of the other embodiments of the measurement application probe also apply mutatis mutandis to the measurement application probe 200.

In the measurement application probe 200 the automotive connector 201 comprises an intermediate adapter connector 205. The intermediate adapter connector 205 comprises a male connector on one side, and a female connector on the other side. All electrical contacts (not explicitly shown), of the male and female connector are coupled or electrically connected through the intermediate adapter connector 205 in a one-to-one fashion.

This allows inserting the intermediate adapter connector 205 into a respective connection in the vehicle, or between the two connectors of such a connection in the vehicle, without any other device noticing the presence of the intermediate adapter connector 205.

A measurement signal may be coupled out to a measurement application device via the cable 204 and the measurement application device connector 203 from any of the electrical contacts in the intermediate adapter connector 205, as will be explained in more detail below.

Figure 3:
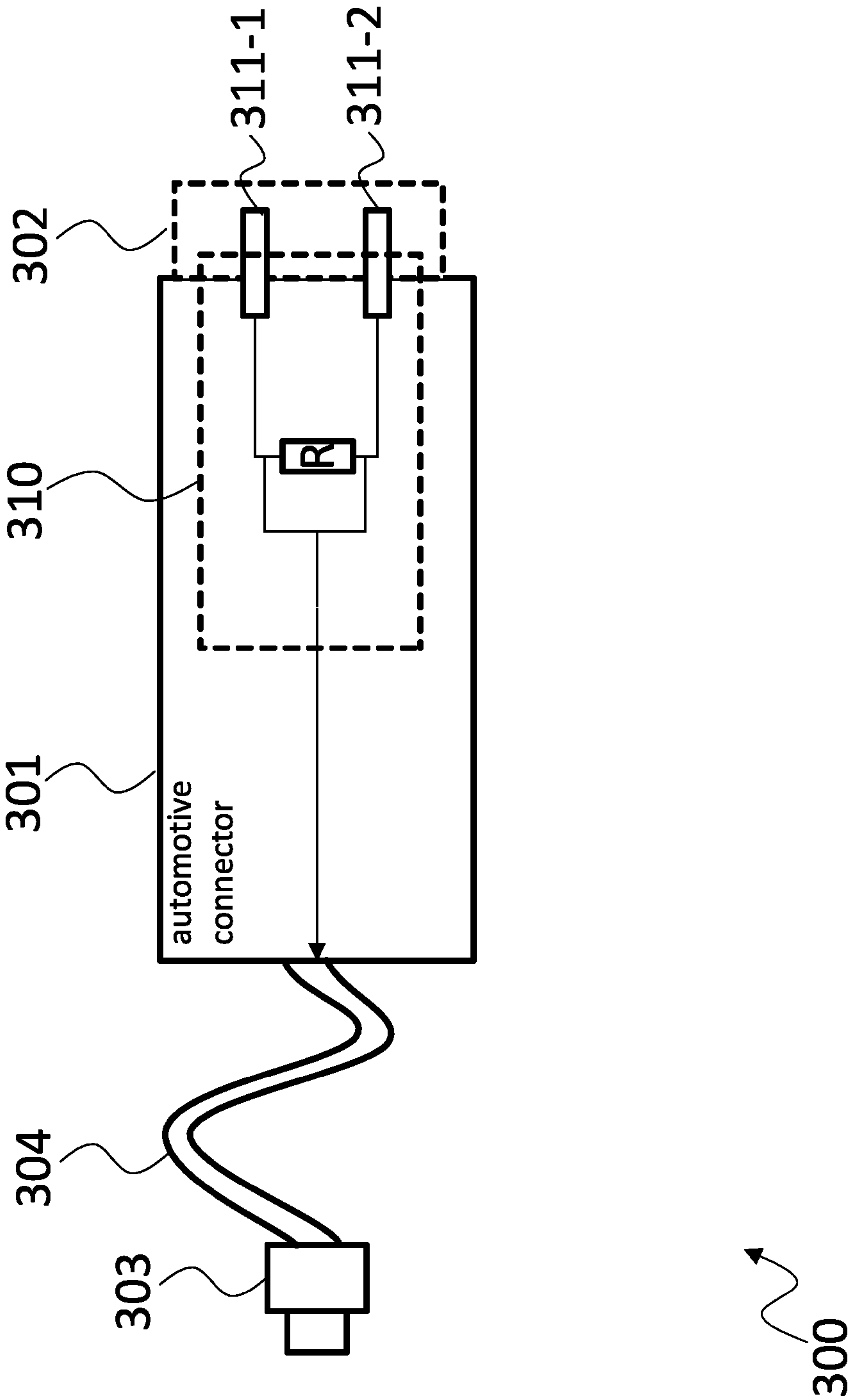
FIG. 3 shows a block diagram of another embodiment of a measurement application probe.

FIG. 3 shows a block diagram of a measurement application probe 300. The measurement application probe 300 is based on the measurement application probe 100. Therefore, the measurement application probe 300 comprises an automotive connector 301 that is coupled via a cable 304 to a measurement application device connector 303. The explanations provided above and below regarding any of the other embodiments of the measurement application probe also apply mutatis mutandis to the measurement application probe 300.

The automotive connector 301 comprises a vehicle diagnostic connector 302 that is only exemplarily shown in dashed lines. In the vehicle diagnostic connector 302 two electrical contacts 311-1, 311-2 are provided in a differential measurement input 310. The differential measurement input 310 is just exemplarily shown as a resistor that couples to the two electrical contacts 311-1, 311-2. It is understood that any implementation of a differential input may be provided in the measurement application probe 300.

In embodiments, any number of electrical contacts, and any number of differential measurement inputs, as well as any number of measurement application device connectors with respective cables may be provided in the automotive connector 301.

Figure 4:
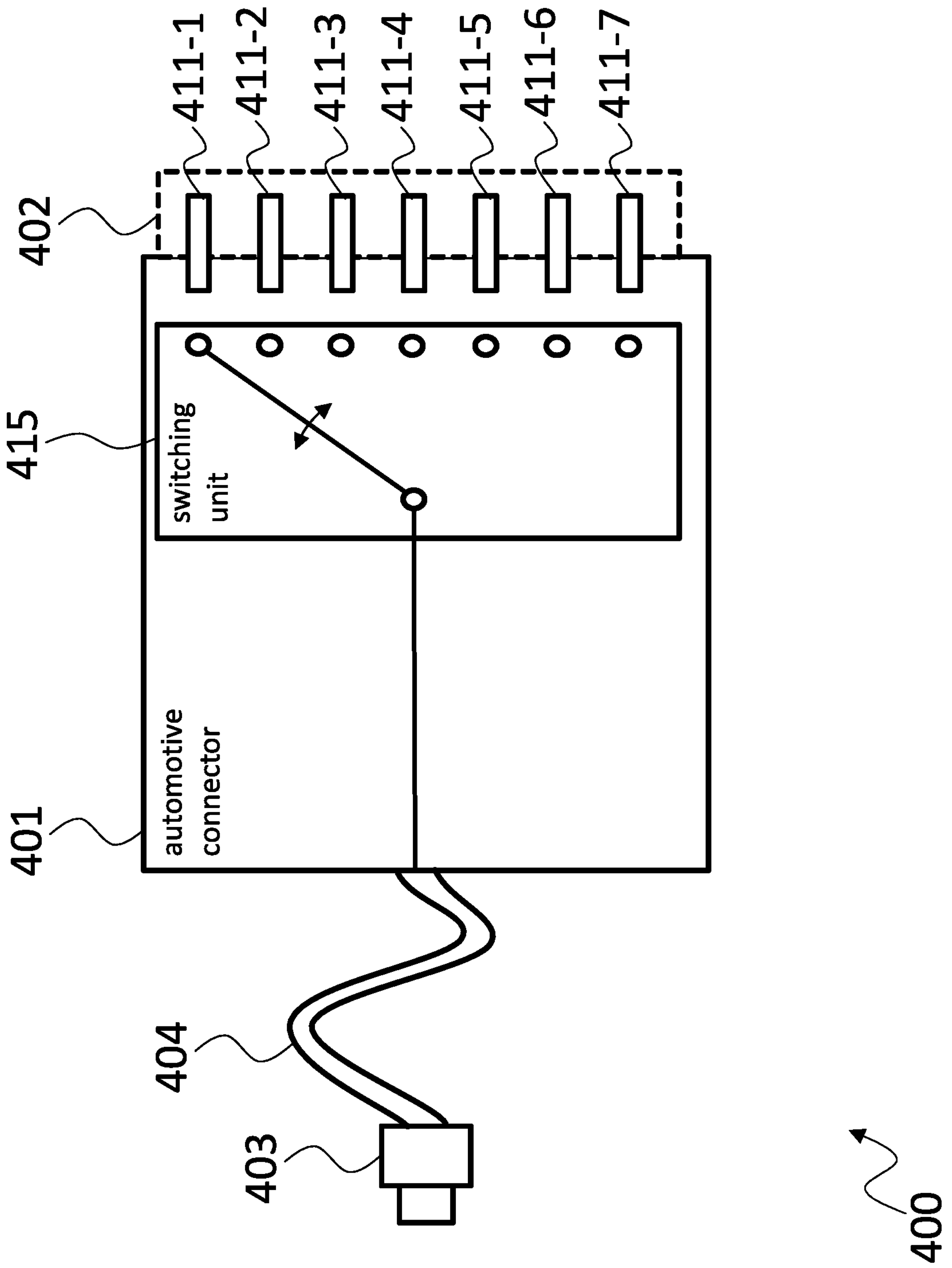
FIG. 4 shows a block diagram of another embodiment of a measurement application probe.

FIG. 4 shows a block diagram of a measurement application probe 400. The measurement application probe 400 is based on the measurement application probe 100. Therefore, the measurement application probe 400 comprises an automotive connector 401 that is coupled via a cable 404 to a measurement application device connector 403. The explanations provided above and below regarding any of the other embodiments of the measurement application probe also apply mutatis mutandis to the measurement application probe 400.

The automotive connector 401 comprises a vehicle diagnostic connector 402 that is only exemplarily shown in dashed lines. In the vehicle diagnostic connector 402 seven electrical contacts 411-1-411-7 are provided. Any other number of electrical contacts is also possible.

The automotive connector 401 further comprises a switching unit 415. The switching unit 415 on one end is coupled to each one of the electrical contacts 411-1-411-7. On the other side, the switching unit 415 is coupled to the cable 404.

The switching unit 415 may selectively couple one of the electrical contacts 411-1-411-7 with the cable 404 for measuring signals from that respective one of the electrical contacts 411-1-411-7 with a measurement application device.

In other embodiments, multiple switching units may be provided in the measurement application probe 400, and a dedicated cable and measurement application device connector may be provided for each of the switching units.

Figure 5:
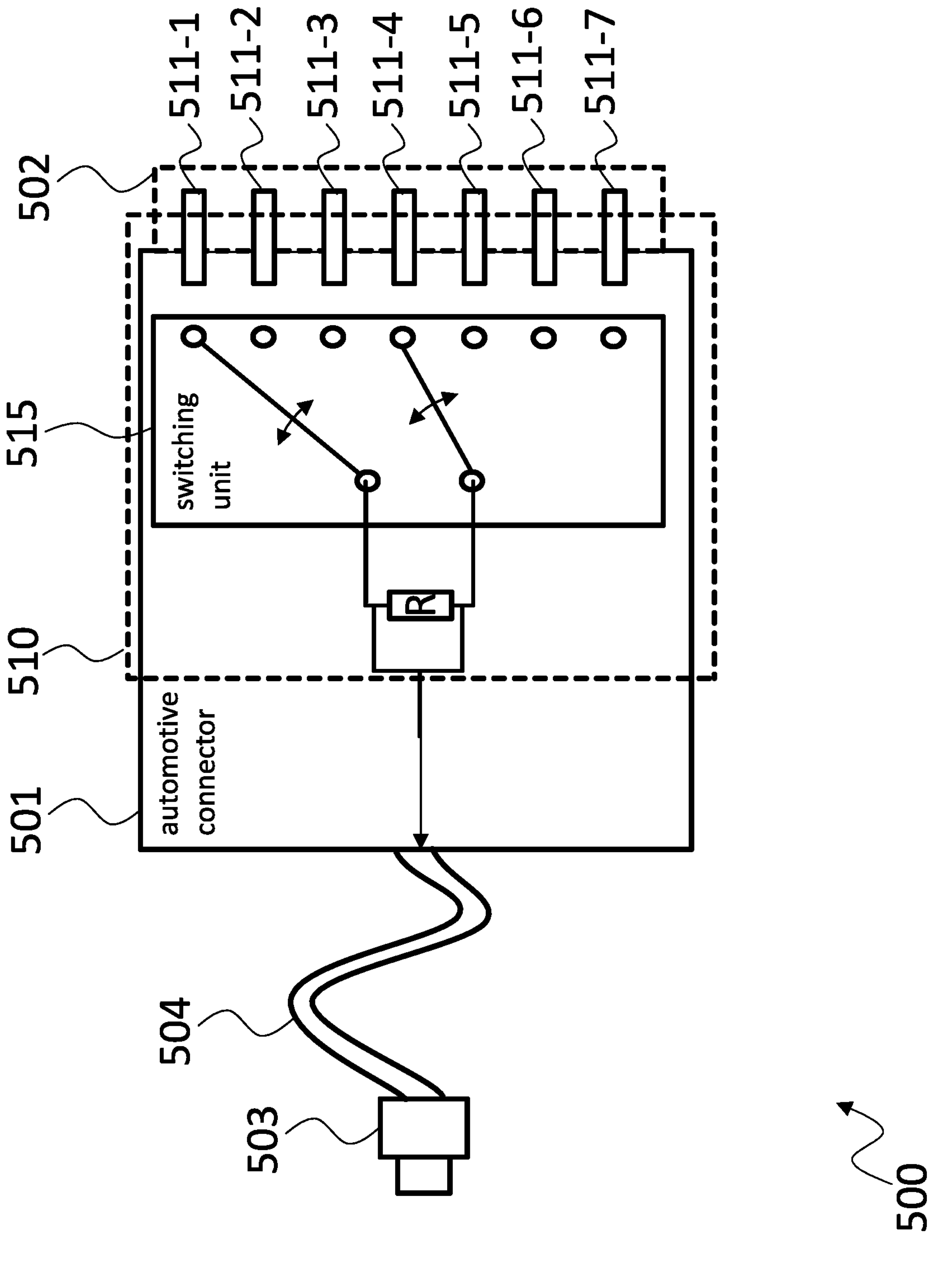
FIG. 5 shows a block diagram of another embodiment of a measurement application probe.

FIG. 5 shows a block diagram of a measurement application probe 500. The measurement application probe 500 is based on the measurement application probe 400. Therefore, the measurement application probe 500 comprises an automotive connector 501 that is coupled via a cable 504 to a measurement application device connector 503. The explanations provided above and below regarding any of the other embodiments of the measurement application probe also apply mutatis mutandis to the measurement application probe 500.

The automotive connector 501 comprises a vehicle diagnostic connector 502 that is only exemplarily shown in dashed lines. In the vehicle diagnostic connector 502 seven electrical contacts 511-1-511-7 are provided, and coupled to a switching unit 515 to form a differential measurement input 510 (again shown only exemplary as resistor). Any other number of electrical contacts is also possible.

The switching unit 515 in contrast to the switching unit 415 comprises two switching elements and two outputs. With the switching unit 515 it is possible to use the signals of two arbitrary ones of the electrical contacts 511-1-511-7 for measuring the differential input signal. Although only one switching unit 515 is shown, any number of switching units is possible, and a respective cable and measurement application device connector may be provided for each switching unit.

Figure 6:
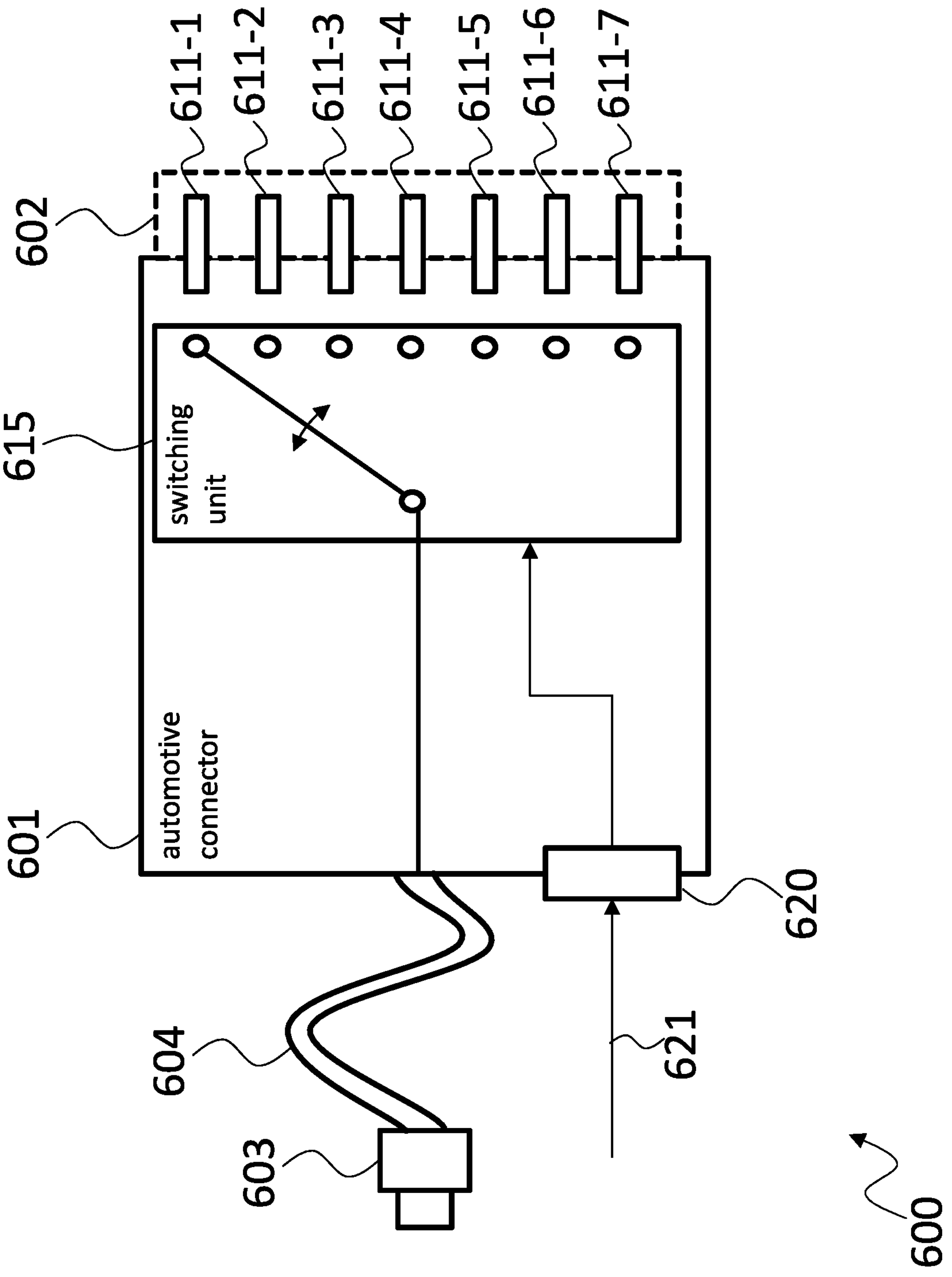
FIG. 6 shows a block diagram of another embodiment of a measurement application probe.

FIG. 6 shows a block diagram of a measurement application probe 600. The measurement application probe 600 is based on the measurement application probe 400. Therefore, the measurement application probe 600 comprises an automotive connector 601 that is coupled via a cable 604 to a measurement application device connector 603. The explanations provided above and below regarding any of the other embodiments of the measurement application probe also apply to the measurement application probe 600 mutatis mutandis.

The automotive connector 601 comprises a vehicle diagnostic connector 602 that is only exemplarily shown in dashed lines. In the vehicle diagnostic connector 602 seven electrical contacts 611-1-611-7 are provided. Any other number of electrical contacts is also possible.

The automotive connector 601 further comprises a switching unit 615. The switching unit 615 on one end is coupled to each one of the electrical contacts 611-1-611-7. On the other side, the switching unit 615 is coupled to the cable 604.

The measurement application probe 600 further comprises a control interface 620 for receiving control signals 621 that are provided to the switching unit 615 for controlling the switching unit 615.

Although not shown, the control interface 620 may also be used to provide data from the measurement application probe 600 e.g., to a measurement application device. Such data may comprise identification data for the measurement application probe 600 which allows the measurement application device to generate adequate control signals 621 for the measurement application probe 600.

Although not shown, the measurement application probe 600 may comprise a controller or control unit for controlling the switching unit 615, and for providing the identification data.

Figure 7:
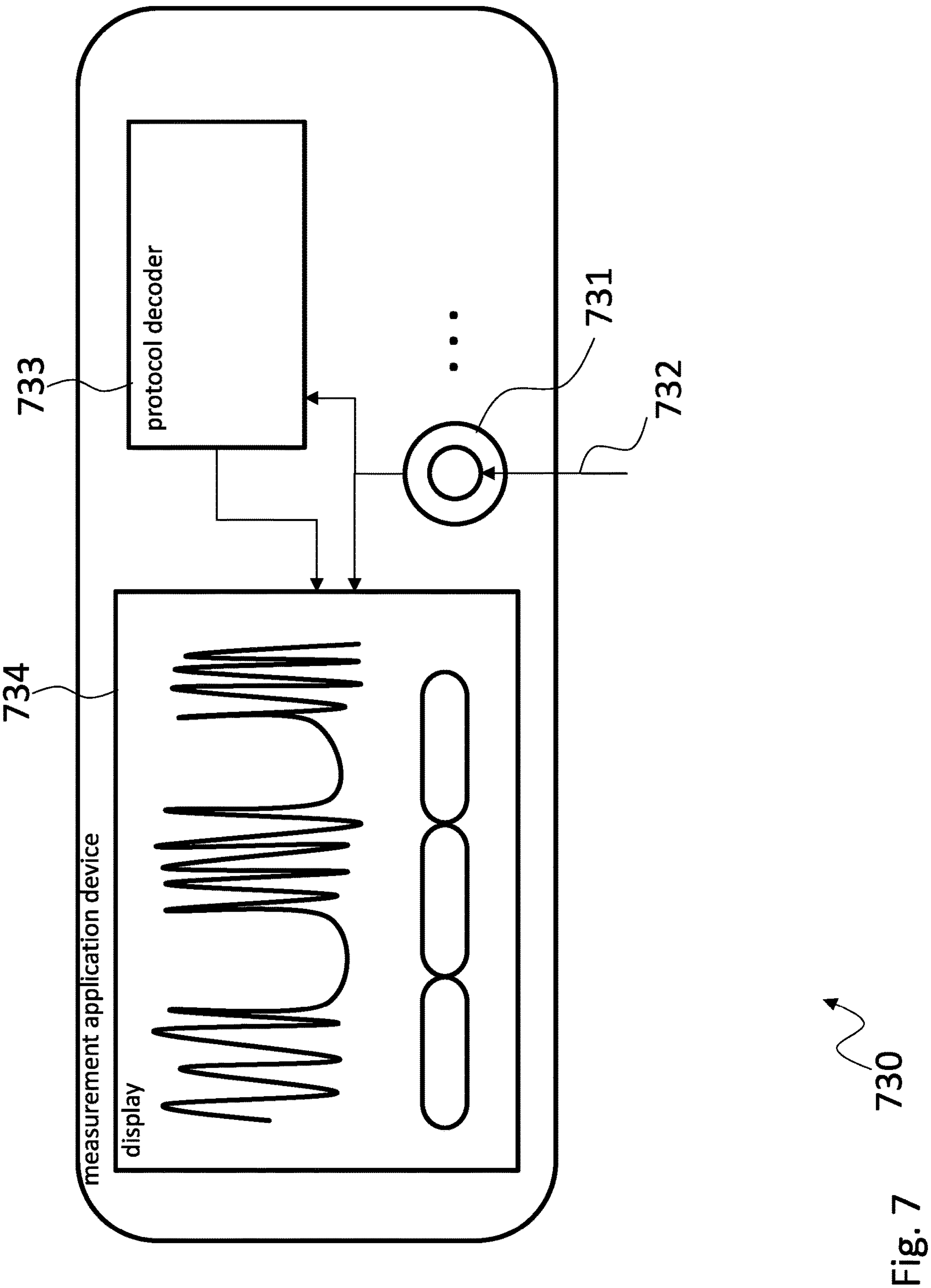
FIG. 7 shows a block diagram of another embodiment of a measurement application device.

FIG. 7 shows a block diagram of a measurement application device 730. The measurement application device 730 may, especially, be used with a measurement application probe according to the present disclosure and receive the raw signals recorded on a bus in a vehicle.

The measurement application device 730 comprises a measurement interface 731 for receiving a measurement signal 732. The measurement interface 731 is coupled to a protocol decoder 733, and a display 734.

The protocol decoder 733 serves for decoding any data protocol that may be used to transmit data on the bus that is the source of the measurement signal 732 that represents the waveform on the respective bus.

The display 734 is exemplarily shown as displaying the waveform provided in the measurement signal 732, and the decoded bus messages below the waveform. In embodiments, any other type of data display may be provided on the display 734 that is based on the measurement signal 732, and the decoded version of the measurement signal 732.

Figure 8:
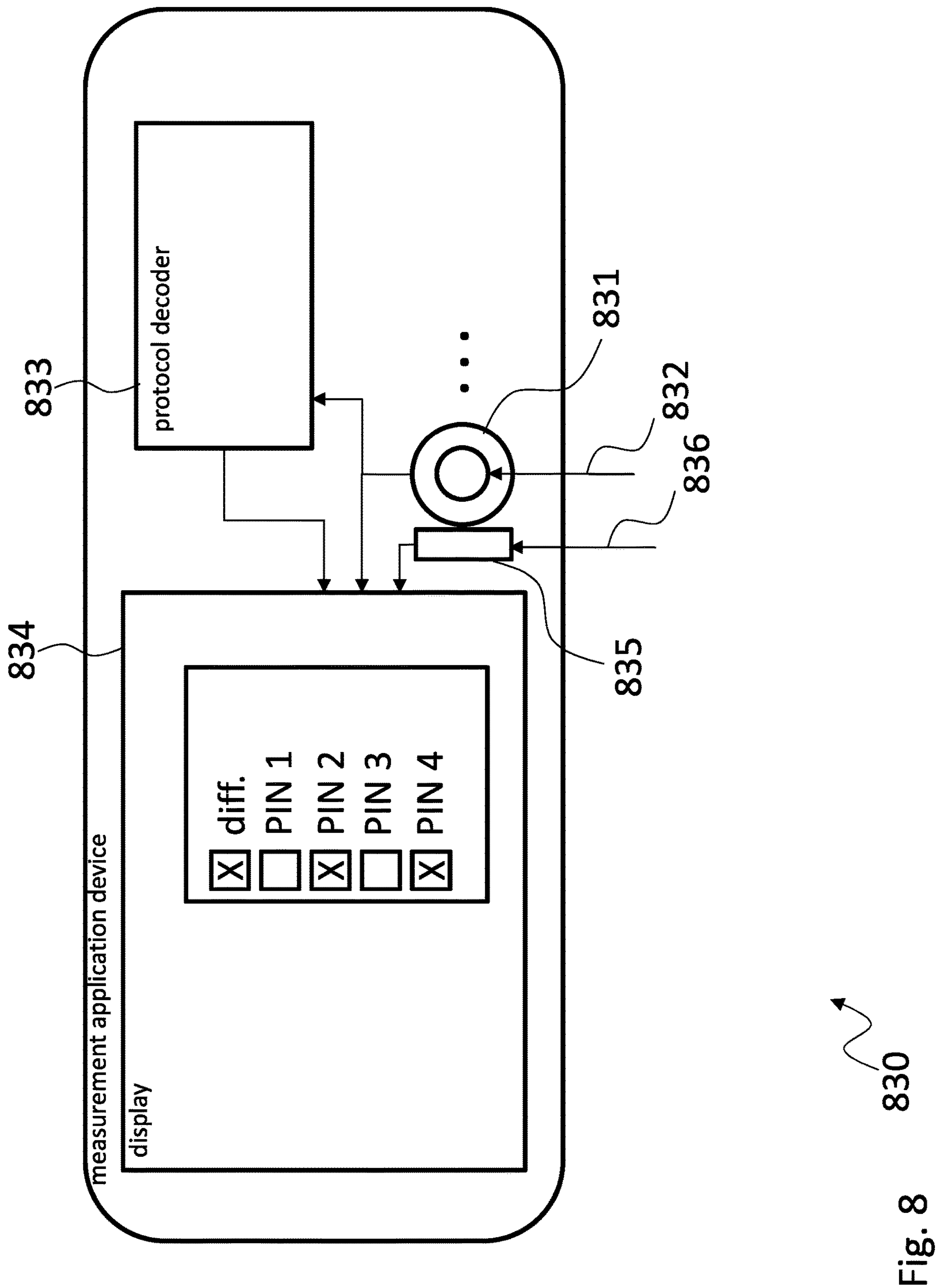
FIG. 8 shows a block diagram of another embodiment of a measurement application device.

FIG. 8 shows a block diagram of a measurement application device 830. The measurement application device 830 is based on the measurement application device 730. Therefore, the measurement application device 830 comprises a measurement interface 831 for receiving a measurement signal 832. The measurement interface 831 is coupled to a protocol decoder 833, and a display 834. The explanations provided regarding the measurement application device 730 apply mutatis mutandis to the measurement application device 830.

The measurement application device 830 further comprises a control interface 835. The control interface 835 may receive identification data 836 from a measurement application probe according to the present disclosure e.g., as shown in FIG. 600.

With the identification data 836, the measurement application device 830 may determine the number of pins or electrical contacts of the vehicle diagnostic connector, and the intermediate adapter connector of the measurement application probe. The user may then be presented with a user interface element that allows the user to select which electrical contacts of the measurement application probe should be used to measure a signal on a vehicle bus.

The control interface 835 may also be used to transmit the user selections or user configuration to the measurement application probe to configure a respective switching unit in the measurement application probe accordingly.

In embodiments, the control interface 835 may comprise a USB interface. In other embodiments, any other type of interface may be used.

Figure 9:
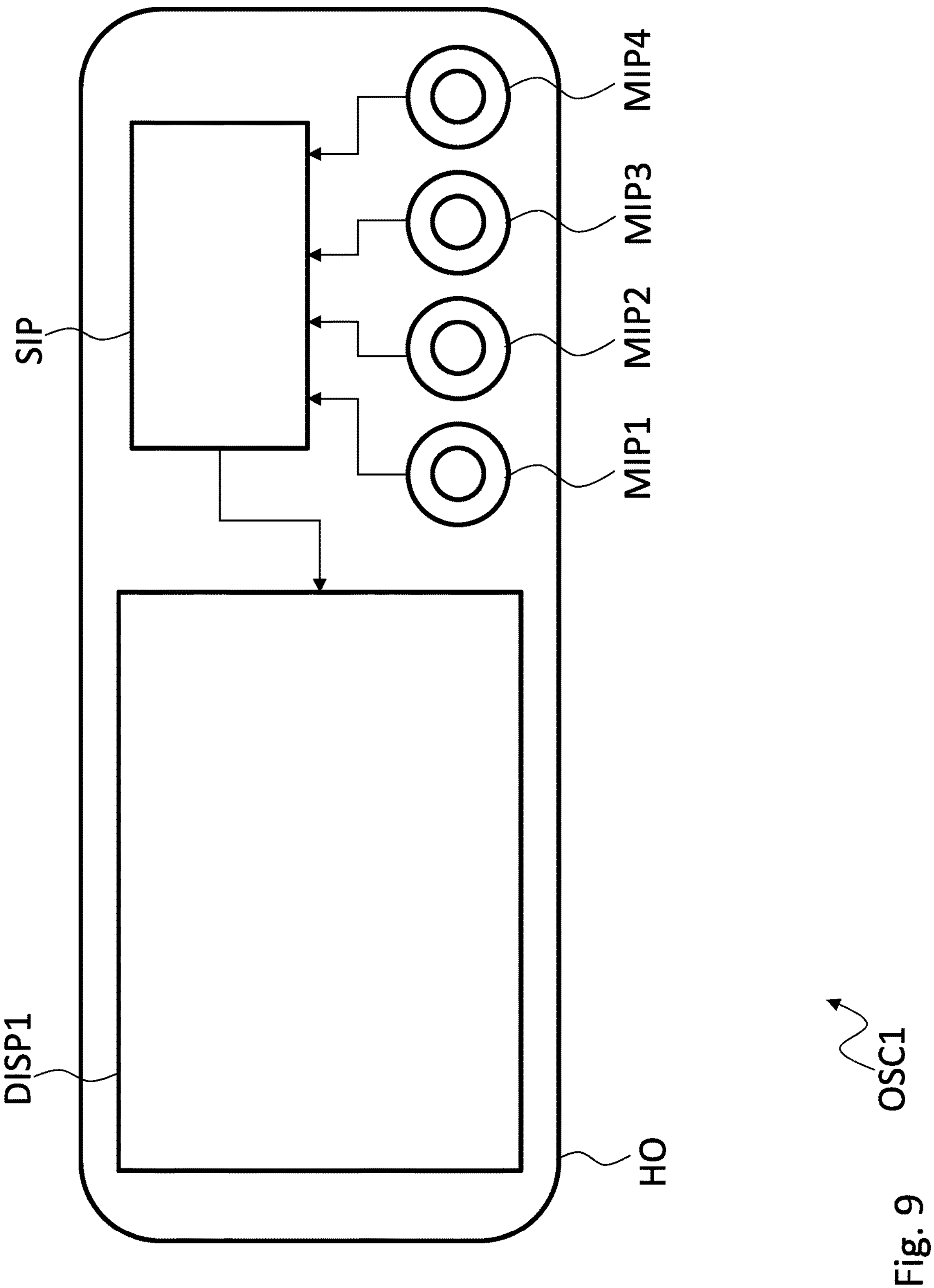
FIG. 9 shows a block diagram of another embodiment of a measurement application device.

FIG. 9 shows a block diagram of an oscilloscope OSC1 that may be used with an embodiment of a measurement application device according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user.

Although not explicitly shown, it is understood, that the oscilloscope OSC1 may also comprise signal outputs that may also be coupled to the differential measurement probe. Such signal outputs may for example serve to output calibration signals. Such calibration signals allow calibrating the measurement setup prior to performing any measurement. The process of calibrating and correcting any measurement signals based on the calibration may also be called de-embedding and may comprise applying respective algorithms on the measured signals.

In the oscilloscope OSC1 the signal processor SIP or an additional processing element may perform the function of the protocol decoder, and the communication with the measurement application probe according to the present disclosure, as well as the displaying of respective information to a user, and receiving user input. Of course, a communication interface may be provided in the oscilloscope OSC1 for communication with other measurement application devices and measurement application probe.

Figure 10:
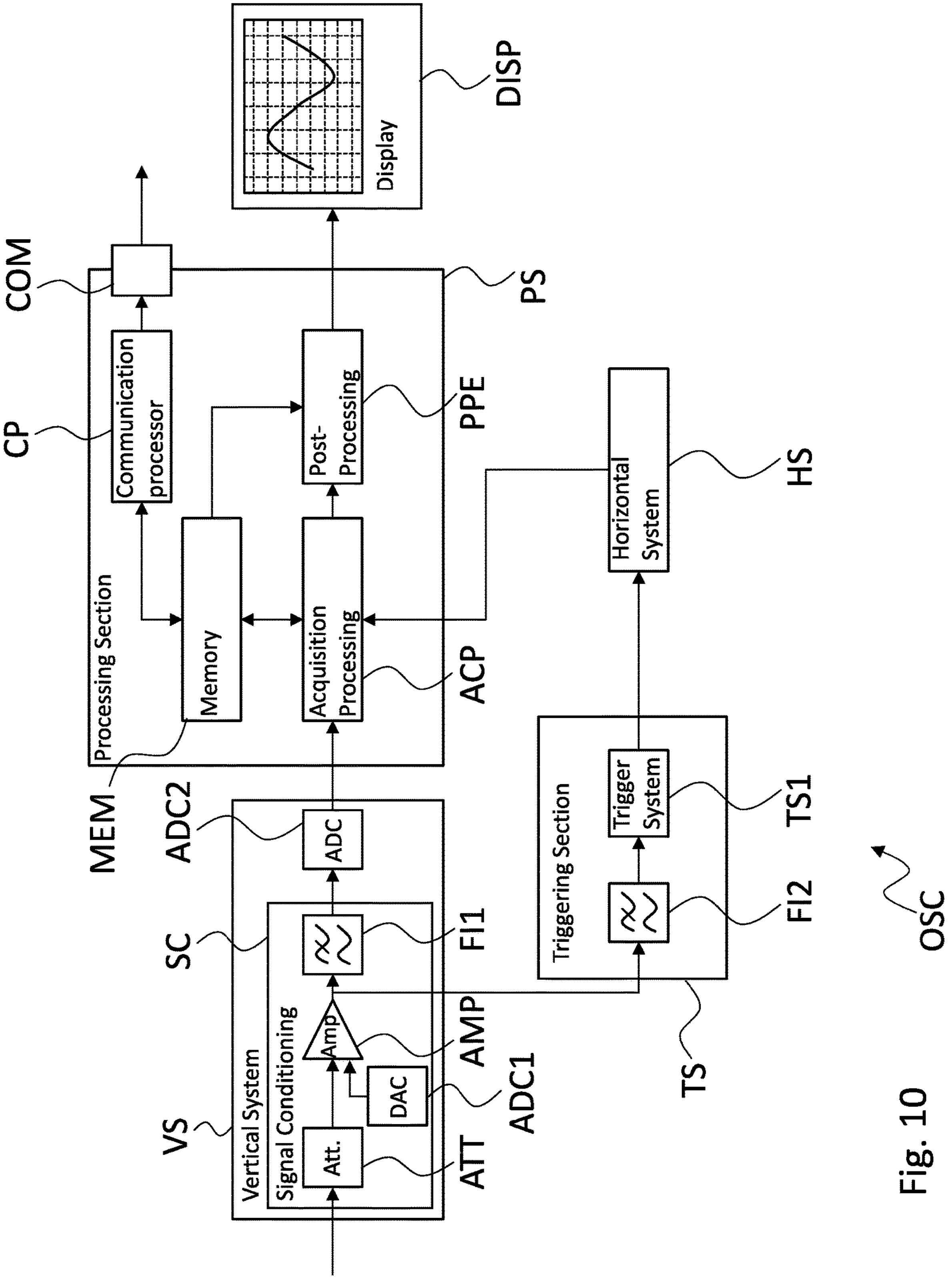
FIG. 10 shows a block diagram of another embodiment of a measurement application device.

FIG. 10 shows a block diagram of an oscilloscope OSC that may be an implementation of a measurement application device according to the present disclosure. The oscilloscope OSC is implemented as a digital oscilloscope. However, the present disclosure may also be implemented with any other type of oscilloscope.

The oscilloscope OSC exemplarily comprises five general sections, the vertical system VS, the triggering section TS, the horizontal system HS, the processing section PS, and the display DISP. It is understood, that the partitioning into five general sections is a logical partitioning and does not limit the placement and implementation of any of the elements of the oscilloscope OSC in any way.

The vertical system VS mainly serves for offsetting, attenuating, and amplifying a signal to be acquired. The signal may for example be modified to fit in the available space on the display DISP or to comprise a vertical size as configured by a user.

To this end, the vertical system VS comprises a signal conditioning section SC with an attenuator ATT and a digital-to-analog-converter DAC that are coupled to an amplifier AMP1. The amplifier AMP1 is coupled to a filter FI1, which in the shown example is provided as a low pass filter. The vertical system VS also comprises an analog-to-digital converter ADC1 that receives the output from the filter FI1 and converts the received analog signal into a digital signal.

The attenuator ATT and the amplifier AMP1 serve to scale the amplitude of the signal to be acquired to match the operation range of the analog-to-digital converter ADC1. The digital-to-analog-converter DAC1 serves to modify the DC component of the input signal to be acquired to match the operation range of the analog-to-digital converter ADC1. The filter FI1 serves to filter out unwanted high frequency components of the signal to be acquired.

The triggering section TS operates on the signal as provided by the amplifier AMP. The triggering section TS comprises a filter FI2, which in this embodiment is implemented as a low pass filter. The filter FI2 is coupled to a trigger system TS1.

The triggering section TS serves to capture predefined signal events and allows the horizontal system HS to e.g., display a stable view of a repeating waveform, or to simply display waveform sections that comprise the respective signal event. It is understood, that the predefined signal event may be configured by a user via a user input of the oscilloscope OSC.

Possible predefined signal events may for example include, but are not limited to, when the signal crosses a predefined trigger threshold in a predefined direction i.e., with a rising or falling slope. Such a trigger condition is also called an edge trigger. Another trigger condition is called "glitch triggering" and triggers, when a pulse occurs in the signal to be acquired that has a width that is greater than or less than a predefined amount of time.

In order to allow an exact matching of the trigger event and the waveform that is shown on the display DISP, a common time base may be provided for the analog-to-digital converter ADC1 and the trigger system TS1.

It is understood, that although not explicitly shown, the trigger system TS1 may comprise at least one of configurable voltage comparators for setting the trigger threshold voltage, fixed voltage sources for setting the required slope, respective logic gates like e.g., a XOR gate, and FlipFlops to generate the triggering signal.

The triggering section TS is exemplarily provided as an analog trigger section. It is understood, that the oscilloscope OSC may also be provided with a digital triggering section. Such a digital triggering section will not operate on the analog signal as provided by the amplifier AMP but will operate on the digital signal as provided by the analog-to-digital converter ADC1.

A digital triggering section may comprise a processing element, like a processor, a DSP, a CPLD, an ASIC or an FPGA to implement digital algorithms that detect a valid trigger event.

The horizontal system HS is coupled to the output of the trigger system TS1 and mainly serves to position and scale the signal to be acquired horizontally on the display DISP.

The oscilloscope OSC further comprises a processing section PS that implements digital signal processing and data storage for the oscilloscope OSC. The processing section PS comprises an acquisition processing element ACP that is couple to the output of the analog-to-digital converter ADC1 and the output of the horizontal system HS as well as to a memory MEM and a post processing element PPE.

The acquisition processing element ACP manages the acquisition of digital data from the analog-to-digital converter ADC1 and the storage of the data in the memory MEM. The acquisition processing element ACP may for example comprise a processing element with a digital interface to the analog-to-digital converter ADC2 and a digital interface to the memory MEM. The processing element may for example comprise a microcontroller, a DSP, a CPLD, an ASIC or an FPGA with respective interfaces. In a microcontroller or DSP, the functionality of the acquisition processing element ACP may be implemented as computer readable instructions that are executed by a CPU. In a CPLD or FPGA the functionality of the acquisition processing element ACP may be configured in to the CPLD or FPGA opposed to software being executed by a processor.

The processing section PS further comprises a communication processor CP and a communication interface COM.

The communication processor CP may be a device that manages data transfer to and from the oscilloscope OSC. The communication interface COM for any adequate communication standard like for example, Ethernet, WIFI, Bluetooth, NFC, an infra-red communication standard, and a visible-light communication standard.

The communication processor CP is coupled to the memory MEM and may use the memory MEM to store and retrieve data.

Of course, the communication processor CP may also be coupled to any other element of the oscilloscope OSC to retrieve device data or to provide device data that is received from the management server.

The post processing element PPE may be controlled by the acquisition processing element ACP and may access the memory MEM to retrieve data that is to be displayed on the display DISP. The post processing element PPE may condition the data stored in the memory MEM such that the display DISP may show the data e.g., as waveform to a user. The post processing element PPE may also realize analysis functions like cursors, waveform measurements, histograms, or math functions.

The display DISP controls all aspects of signal representation to a user, although not explicitly shown, may comprise any component that is required to receive data to be displayed and control a display device to display the data as required.

It is understood, that even if it is not shown, the oscilloscope OSC may also comprise a user interface for a user to interact with the oscilloscope OSC. Such a user interface may comprise dedicated input elements like for example knobs and switches. At least in part the user interface may also be provided as a touch sensitive display device.

In the oscilloscope OSC, any one of the processing elements in the processing section PS or an additional processing element may perform the function of the protocol decoder, and the communication with the measurement application probe according to the present disclosure, as well as the displaying of respective information to a user, and receiving user input.

It is understood, that all elements of the oscilloscope OSC that perform digital data processing may be provided as dedicated elements. As alternative, at least some of the above-described functions may be implemented in a single hardware element, like for example a microcontroller, DSP, CPLD or FPGA. Generally, the above-describe logical functions may be implemented in any adequate hardware element of the oscilloscope OSC and not necessarily need to be partitioned into the different sections explained above.

Figure 11:
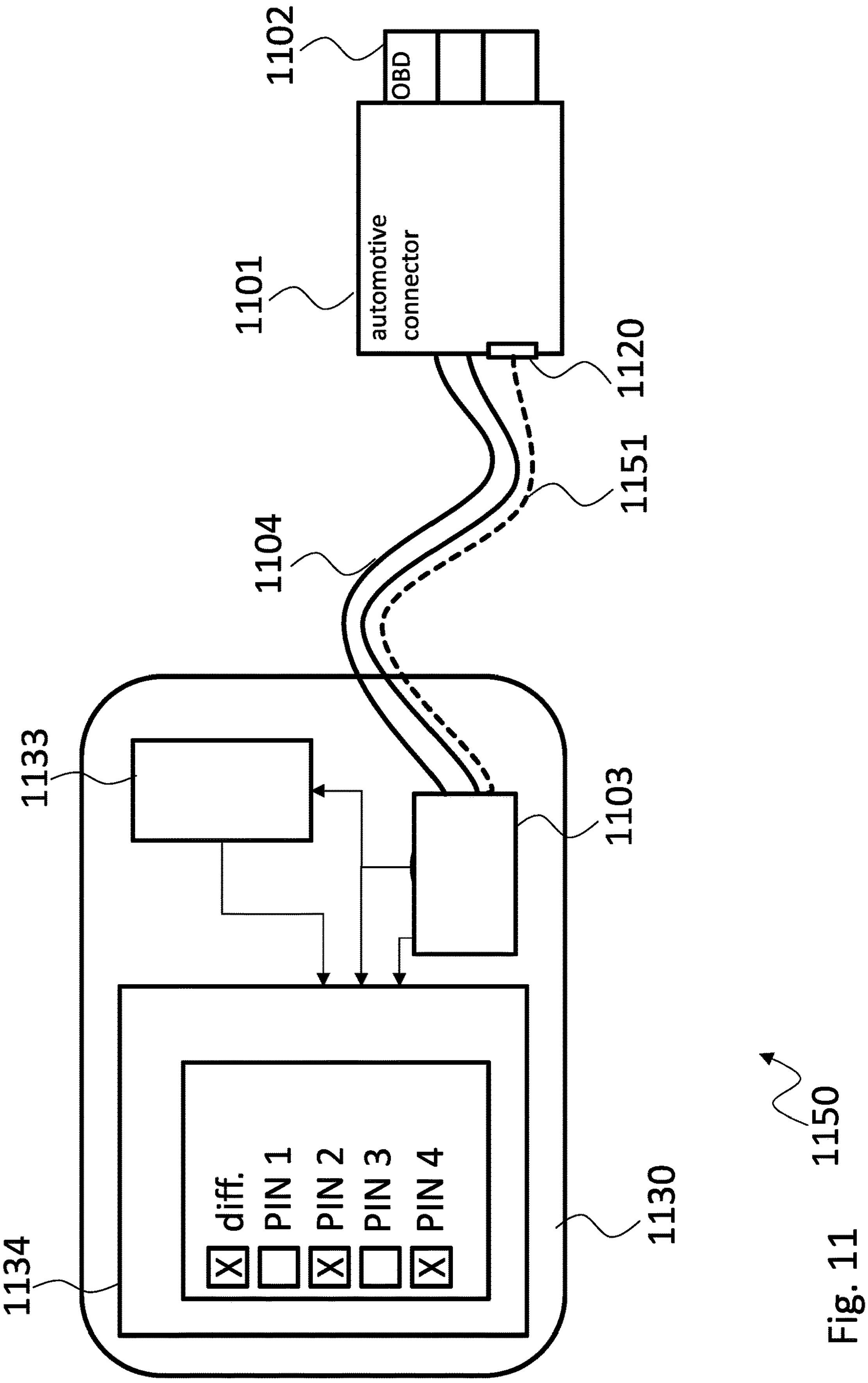
FIG. 11 shows a block diagram of an embodiment of a measurement application system.

FIG. 11 shows a block diagram of an embodiment of a measurement application system 1150. The measurement application system 1150 comprises a measurement application device 1130 as shown in FIG. 8, and a measurement application probe as shown in FIG. 6.

The measurement application probe comprises an automotive connector 1101 with an OBD vehicle diagnostic connector 1102. The cable 1104 couples the automotive connector 1101 via the measurement application device connector 1103 to the measurement application device 1130. The measurement application probe further comprises a control interface 1120 for transmitting and receiving digital data, like transmitting identification data and receiving control data or a control signal. A digital data line 1151 is shown from the measurement application device connector 1103 to the control interface 1120. In embodiments, the data line 1151 may be a dedicated data line. In other embodiments, the data line 1151 may be integrated into the cable 1104.

The measurement application device 1130 comprises a measurement interface with a control interface, that are both covered by the measurement application device connector 1103. Further, the measurement application device 1130 comprises a protocol decoder 1133, and a display 1134, as explained for the measurement application device 830.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

100, 200, 300, 400, 500, 600 measurement application probe
101, 301, 401, 501, 601, 1101 automotive connector
102, 302, 402, 502, 602, 1102 vehicle diagnostic connector
103, 203, 303, 403, 503, 603, 1103 measurement application device connector
104, 204, 304, 404, 504, 604, 1104 cable
205 intermediate adapter connector
310, 510 differential measurement input
311-1-311-2, 411-1-411-7 electrical contact
511-1-511-7, 611-1-611-7 electrical contact
415, 515 switching unit
620, 1120 control interface
621 control signal
730, 830, 1130 measurement application device
731, 831 measurement interface
732, 832 measurement signal
733, 833, 1133 protocol decoder
734, 834, 1134 user interface
835 control interface
836 identification data
1150 measurement application system
1151 data line
OSC1 oscilloscope
HO housing
MIP1, MIP2, MIP3, MIP4 measurement input
SIP signal processing
DISP1 display
OSC oscilloscope
VS vertical system
SC signal conditioning
ATT attenuator
DAC1 analog-to-digital converter
AMP1 amplifier
FI1 filter
ADC1 analog-to-digital converter
TS triggering section
AMP2 amplifier
FI2 filter
TS1 trigger system
HS horizontal system
PS processing section
ACP acquisition processing element
MEM memory
PPE post processing element
DISP display

What is claimed is:

1. A measurement application probe comprising:

an automotive connector configured to couple to an in-vehicle connector for receiving analog waveforms provided via the in-vehicle connector, the automotive connector includes a plurality of electrical contacts each one configured to electrically couple to a respective counterpart contact of the in-vehicle connector;

at least one measurement application device connector, coupled to the automotive connector and configured to couple the measurement application probe to a respective measurement application device; and a switching unit coupled to the automotive connector and to the at least one measurement application device connector, wherein the switching unit is configured to controllably couple at least one of the measurement application device connectors electrically with a selected one of the electrical contacts of the automotive connector.

2. The measurement application probe according to claim 1, wherein the automotive connector comprises at least one of:

a vehicle diagnostic connector configured to couple to a diagnostic in-vehicle connector of a vehicle; and an intermediate adapter connector configured to couple between an in-vehicle plug and a respective in-vehicle connector of a vehicle wiring harness.

3. The measurement application probe according to claim 1, wherein the automotive connector comprises a differential measurement input for at least one of the measurement application device connectors.

4. The measurement application probe according to claim 1, wherein the switching unit comprises a manually actuated switching element.

5. The measurement application probe according to claim 1, further comprising:

a control interface coupled to the switching unit.

6. The measurement application probe according to claim 5, wherein the switching unit comprises an electrically controlled switching element.

7. The measurement application probe according to claim 6, wherein the control interface is configured to receive control signals, and wherein the switching unit is configured to couple a signal conductor of at least one of the measurement application device connectors electrically with a selected one of the electrical contacts of the automotive connector based on the received control signals.

8. The measurement application probe according to claim 1, wherein the measurement application device connector comprises a coaxial connector.

9. A measurement application device comprising:

at least one measurement interface configured to couple to a measurement application probe for coupling the measurement application device to an in-vehicle connector, and to a acquire an analog measurement signal from the measurement application probe, the measurement signals including analog waveforms provided via the in-vehicle connector; and a protocol decoder coupled to the measurement interface, and configured to decode the received at least one measurement signal according to a predefined communication protocol, wherein the measurement application device shows the acquired measurement signal to a user in analog form, and in digital form as at least one of the decoded data, and bus messages in linear or tabular form.

10. The measurement application device according to claim 9, further comprising a control interface configured to couple to a control interface of the measurement application probe, and to retrieve probe identification data from the measurement application probe.

11. The measurement application device according to claim 10, further comprising a user interface configured to present contact selection information to a user based on the identification data, and to receive a user input regarding a selection of at least one electrical contact of the measurement application probe, and wherein the control interface is further configured to transmit a control signal to the measurement application probe for controlling the measurement application probe to couple the selected at least one electrical contact in the measurement application probe to a respective one of the measurement interfaces based on the received user input.

12. A measurement application system comprising:

a measurement application probe comprising:

an automotive connector configured to couple to an in-vehicle connector for receiving analog waveforms provided via the in-vehicle connector, the automotive connector including a plurality of electrical contacts each configured to electrically couple to a respective counterpart contact of the in-vehicle connector; and at least one measurement application device connector coupled to the automotive connector; and the measurement application system further comprising a measurement application device coupled to the at least one measurement application device connector, the measurement application device comprising:

at least one measurement interface coupled to a respective measurement application device connector of the measurement application probe, and configured to acquire an analog measurement signal from the measurement application probe, the analog measurement signal including analog waveforms provided via the in-vehicle connector; and a protocol decoder coupled to the measurement interface, and configured to decode the received at least one measurement signal according to a predefined communication protocol.

13. The measurement application system according to claim 12, wherein the automotive connector of the measurement application probe comprises at least one of:

a vehicle diagnostic connector configured to couple to a diagnostic in-vehicle connector of a vehicle; and an intermediate adapter connector configured to couple between an in-vehicle connector and a respective in-vehicle plug.

14. The measurement application system according to claim 12, wherein the automotive connector of the measurement application probe comprises a differential measurement input for every measurement application device connector.

15. The measurement application system according to claim 12, wherein the automotive connector of the measurement application probe comprises a plurality of electrical contacts each one configured to electrically couple to a respective counterpart contact of the in-vehicle connector.

16. The measurement application system according to claim 15, wherein the measurement application probe further comprises:

a switching unit coupled to the automotive connector of the measurement application probe, and the at least one measurement application device connector of the measurement application probe, wherein the switching unit is configured to controllably couple at least one of the measurement application device connectors of the measurement application probe electrically with a selected one of the electrical contacts of the automotive connector of the measurement application probe.

17. The measurement application system according to claim 16, wherein the switching unit of the measurement application probe comprises a manually actuated switching element.

18. The measurement application system according to claim 16, wherein:

the measurement application probe comprises a probe control interface; and the measurement application device further comprises a device control interface configured to couple to the probe control interface of the measurement application probe, and to retrieve probe identification data from the measurement application probe.

19. The measurement application system according to claim 18, wherein the switching unit of the measurement application probe comprises an electrically controlled switching element, and wherein the probe control interface is coupled to the switching unit of the measurement application probe.

20. The measurement application system according to claim 19, wherein the measurement application device further comprises a user interface configured to present contact selection information to a user based on the identification data, and to receive a user input regarding a selection of at least one electrical contact of the measurement application probe, wherein the device control interface is further configured to transmit a control signal to the measurement application probe based on the received user input, wherein the probe control interface of the measurement application probe is configured to receive the control signal, and wherein the switching unit of the measurement application probe is configured to couple a signal conductor of at least one of the measurement application device connectors of the measurement application probe electrically with a selected one of the electrical contacts of the automotive connector of the measurement application probe based on the received control signals.

21. The measurement application system according to claim 12, wherein the measurement application device connector of the measurement application probe comprises a coaxial connector, and wherein the at least one measurement interface of the measurement application device comprises a coaxial connector.

* * * * *